United States Patent
Dubrovin

(10) Patent No.: US 6,828,928 B2
(45) Date of Patent: Dec. 7, 2004

(54) MOTOR-VEHICLE DRIVING ASSISTANCE DEVICE WHICH IS OPTIMIZED BY SYNERGY WITH AN ADAPTIVE LIGHTING SYSTEM

(75) Inventor: Alexis Dubrovin, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 10/318,724

(22) Filed: Dec. 13, 2002

(65) Prior Publication Data

US 2003/0122704 A1 Jul. 3, 2003

(30) Foreign Application Priority Data

Dec. 20, 2001 (FR) ............................................. 01 16505

(51) Int. Cl.⁷ .............................................. H01Q 15/00
(52) U.S. Cl. ............................ 342/70; 342/71; 342/72; 342/75; 315/82; 362/40; 362/43
(58) Field of Search ............................. 342/70–75, 81, 342/82; 180/210; 250/208.1; 315/77, 79–82; 340/930, 933; 362/40, 43, 465, 466, 512–514, 517; 382/104

(56) References Cited

U.S. PATENT DOCUMENTS

| | | | | |
|---|---|---|---|---|
| 5,266,955 | A | 11/1993 | Izumi et al. | 342/70 |
| 6,294,986 | B1 | 9/2001 | Landsiedel | 340/435 |
| 6,578,992 | B2 * | 6/2003 | Hiramatsu et al. | 362/465 |
| 6,578,993 | B2 * | 6/2003 | Kobayashi et al. | 362/466 |
| 6,611,610 | B1 * | 8/2003 | Stam et al. | 382/104 |
| 6,626,564 | B2 * | 9/2003 | Horii et al. | 362/466 |
| 6,626,565 | B2 * | 9/2003 | Ishida | 362/514 |
| 6,633,027 | B2 * | 10/2003 | Kobayashi et al. | 250/208.1 |
| 6,637,914 | B2 * | 10/2003 | Naganawa | 362/465 |
| 6,641,292 | B2 * | 11/2003 | Miki et al. | 362/513 |
| 6,652,110 | B2 * | 11/2003 | Hayami | 362/40 |
| 6,652,130 | B2 * | 11/2003 | Mochizuki et al. | 362/517 |
| 2003/0107321 | A1 * | 6/2003 | Horiuchi | 315/77 |
| 2003/0174493 | A1 * | 9/2003 | Kinouchi | 362/43 |
| 2003/0174508 | A1 * | 9/2003 | Ruckwied | 362/512 |

FOREIGN PATENT DOCUMENTS

DE 100 18 556 A1 10/2001
EP 1 034 963 A1 9/2000

OTHER PUBLICATIONS

French Search Report dated Oct. 4, 2002.

* cited by examiner

Primary Examiner—John B. Sotomayor
(74) Attorney, Agent, or Firm—Morgan & Finnegan, LLP

(57) ABSTRACT

Driving assistance device for a motor vehicle, including at least one emitter of radiation toward the front of the vehicle, a receiver of part of this radiation reflected by a target vehicle, and control and calculation means for influencing the acceleration and braking of the following vehicle in accordance with information coming from the unit comprising the emitter and the receiver and in accordance with data pertaining to the following vehicle. At least the emitter is mounted so as to be rotatable in terms of the azimuth and means for driving the emitter in rotation are provided in order to modify the azimuth of the beam of the emitter in accordance with the curvature of the road. This beam advantageously turns by the same angle as that of the beam of an adaptive lighting system.

17 Claims, 4 Drawing Sheets

MOTOR-VEHICLE DRIVING ASSISTANCE DEVICE WHICH IS OPTIMIZED BY SYNERGY WITH AN ADAPTIVE LIGHTING SYSTEM

FIELD OF THE INVENTION

The invention relates to a driving assistance device, in particular a device of this kind which is optimised by synergy with an adaptive lighting system, for a motor vehicle, allowing a following vehicle to keep its distance from a followed vehicle or target vehicle, freeing the driver from any need to take action at the accelerator pedal or brake pedal.

BACKGROUND OF THE INVENTION

A device of this kind, generally designated by the abbreviation ACC (Automatic Cruise Control), is able to automatically influence the acceleration and braking of the following vehicle so as to adapt its speed to that of the target vehicle.

The driving assistance device comprises at least one emitter of radiation towards the front of the vehicle, at least one receiver for part of this radiation reflected by the target vehicle, and means of calculation and control for influencing the acceleration and braking of the following vehicle in accordance with the information coming from the emitter-receiver unit and in accordance with various other data pertaining to the following vehicle (speed, etc . . . ).

At the moment when the driving assistance device is activated, the driver of the following vehicle is invited to specify a reference speed (to which the vehicle will automatically return if the ACC mode is no longer required) and a reference "flight time". This "flight time" corresponds to the time required, at a given moment, for the following vehicle to reach the position of the target vehicle in front of it. This flight time is commonly between 1 second and 2 seconds. Setting this flight time determines the distance which must be maintained between the following vehicle and the target vehicle at a given speed.

The emitter-receiver unit of the vehicle is generally of the radar or lidar type. The lidar comprises an infrared emitter with an optical sensor as a receiver.

When the ACC assistance device is activated, it searches to ascertain whether there is a vehicle capable of being followed along the axis of the following vehicle at a distance within a certain range according to a given detection angle and with a reasonable speed difference. When these conditions are satisfied, the driving assistance device indicates on the dashboard of the following vehicle that there is a potential target vehicle, and the driver can then decide to "attach himself" to this vehicle by acting on a specific lever. From this moment, when the target vehicle accelerates or decelerates, the following vehicle automatically does the same. There are multiple safeguards.

It is possible that the following vehicle will lose track of the target vehicle, this generally corresponding to a normal operating mode: for example, the target vehicle has changed lane or has left the road at a junction, or the following vehicle itself has changed lane. In this case, the assistance device makes the following vehicle return progressively to its reference speed.

However, it can also happen that the following vehicle loses track of the target vehicle on a more or less pronounced bend or owing to confusion with other vehicles to the side when the target vehicle is still in front on the path of the following vehicle. The following vehicle then returns to its reference speed, which is generally higher than the instantaneous speed since there is a tendency to slow down on a bend. The following vehicle then rapidly catches up with the previous target vehicle without "seeing it", giving rise to a risk to the driver.

Various solutions have been proposed: for example several beams or oscillatory beams for dynamic scanning of the emitter, but these methods are generally expensive if they are to be effective, or are not very effective when they are inexpensive.

It is the object of the invention, above all, to provide a driving assistance device of the type defined previously which no longer has the disadvantages mentioned above or has them to a lesser degree, and the cost price of which remains acceptable.

SUMMARY OF THE INVENTION

According to the invention, a driving assistance device for a motor vehicle includes at least one emitter of radiation toward the front of the vehicle, a receiver of part of this radiation reflected by a target vehicle, and control and calculation means for influencing the acceleration and braking of the following vehicle in accordance with the information coming from the emitter-receiver unit and in accordance with data pertaining to the following vehicle, and is characterised in that at least the emitter is mounted so as to be rotatable in terms of the azimuth and in that means for driving the emitter in rotation are provided in order to modify the azimuth of the beam of the emitter in accordance with the curvature of the road.

The receiver is preferably mounted so as to be rotatable with the emitter.

When the vehicle is fitted with a lighting optimisation system including means capable of providing information on the curvature of the road, control of the rotation of the emitter of the driving assistance device is advantageously performed on the basis of road curvature information gathered by the control unit of the lighting optimisation system.

The driving assistance device can be integrated into a headlamp.

The invention then allows the ACC driving assistance device to benefit from the functions of the lighting optimisation system. The driving assistance device no longer needs a costly angular motor drive and/or additional data interpretation.

The integration of the ACC driving assistance device into a headlamp allows it to benefit from features that protect it against rain and dirt and from any attitude correction, which allows simplification of the vertical scanning of the targets.

When the headlamp includes a rotary headlamp mounted on a plate that can rotate in terms of the azimuth about an essentially vertical pivot to ensure optimisation of lighting, the driving assistance device preferably includes an emitter mounted on the same rotary plate as the headlamp.

The rotary headlamp can be an additional headlamp, in particular fitted in the protective moulding of the vehicle, and at least the emitter of the assistance device is mounted on the rotary plate of the additional headlamp.

As a variant, the emitter can be mounted on a different, auxiliary plate rotatable in terms of the azimuth about a vertical pivot, rotational control of this plate being provided by the control unit of the plate of the headlamp. The auxiliary plate can be arranged in the same housing as the plate of the headlamp; a mechanism for transmitting the rotation of the plate of the headlamp to the auxiliary plate can be provided.

According to another possibility, the auxiliary plate is arranged in a different housing than that accommodating the plate of the headlamp.

A device for driving the auxiliary plate in rotation is controlled by the control unit of the plate of the headlamp.

The headlamp can include an additional fixed, pre-turned headlamp, the luminous intensity of which is controlled in accordance with the curvature of the road; the emitter is then mounted on an auxiliary plate rotatable in terms of the azimuth about a vertical pivot, the device for driving this plate in rotation being controlled by the control unit for the luminous intensity of the additional headlamp.

The receiver is preferably mounted on the same rotary plate as the emitter.

As a variant, the receiver is mounted in a fixed manner in a housing situated at the front of the vehicle, preferably in the central region. An emitter is mounted in both the right-hand and the left-hand headlamp, on the corresponding rotary plate.

When the vehicle is fitted with a lighting optimisation system controlling rotation in the horizontal plane of the headlamps, both toward the inside and toward the outside of a bend, a single emitter can be provided for the assistance device, this emitter being mounted either on the plate of the right-hand headlamp or of the left-hand headlamp.

In the case of a lighting optimisation system in which each of the headlamps can turn toward the outside to provide a BL function, each of the headlamps is fitted with an assistance device and the unit is set up so that the active side (side of the headlamp which is in the process of turning) inhibits the assistance device on the other side to ensure that only one assistance device is used at any one time.

Apart from the arrangements explained above, the invention consists in a certain number of other arrangements, which will be discussed more explicitly below in the context of embodiment examples described with reference to the attached drawings, which are in no way restrictive however. In these drawings:

BRIEF DESCRIPTION OF THE DRAWINGS

Finally.

DESCRIPTION OF THE PREFERRED EMBODIMENTS

Figure 1:
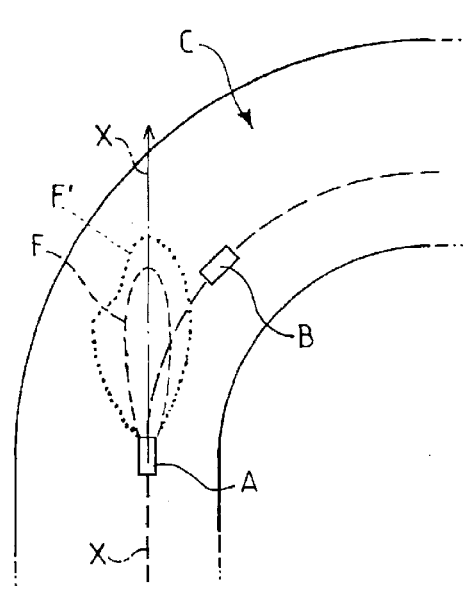
FIG. 1 is a schematic view from above of a target vehicle and of a following vehicle fitted with a conventional ACC assistance device on a bend.

FIG. 1 shows a vehicle A fitted with a conventional ACC driving assistance device, the emitter of which sends towards the front of the vehicle a beam F, the axis of which is fixed relative to the vehicle A and parallel to the longitudinal axis X—X of this vehicle. F' indicates the outline of the illumination beam of the low-beam lamps.

A target vehicle is represented by B. Before entering a bend C, the vehicle B has been detected by the beam F of the following vehicle A. In taking the bend, the target vehicle B moves out of the beam F, and the following vehicle A loses track of the target vehicle B, with the consequences explained above.

Figure 2:
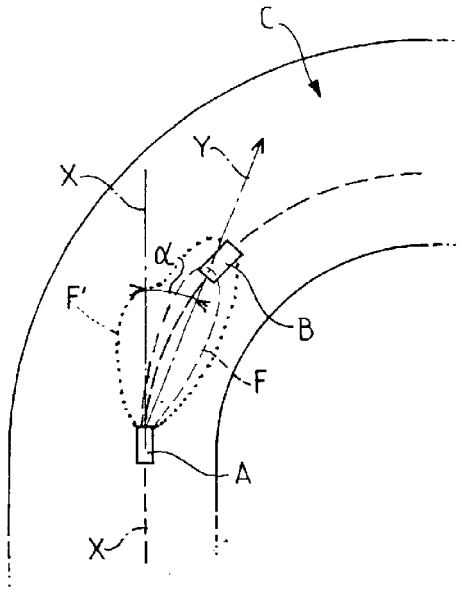
FIG. 2 is a schematic view similar to FIG. 1 when the following vehicle is fitted with an ACC assistance device according to the invention.

FIG. 2 shows the following vehicle A fitted with an ACC driving assistance device according to the invention. The azimuth of the beam F of the emitter, that is to say the angle a between the longitudinal axis X—X of the vehicle A and the axis Y of the beam F, is modified in accordance with the curvature of the road in such a way as to follow this curvature with the beam. In FIG. 2, it will be seen that the beam F always strikes the target vehicle B, of which the following vehicle A does not lose track.

Figure 3:
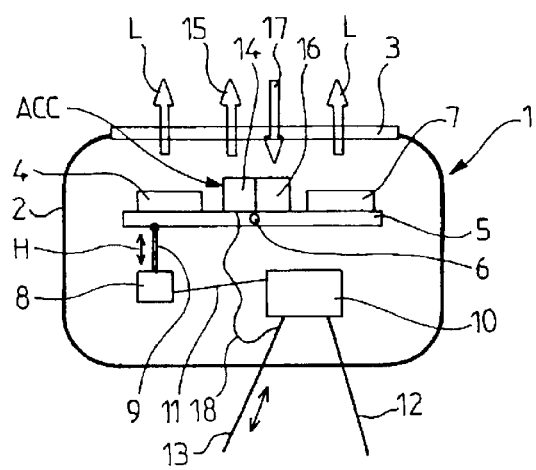
FIG. 3 is a schematic plan view of a headlamp with an ACC device integrated into a headlamp, the housing being sectioned by a horizontal plane.

FIG. 3 is a schematic view from above of an ACC driving assistance device integrated into a headlamp 1 mounted at the front of the vehicle. The headlamp 1 comprises a housing 2 provided at the front with a transparent optic 3. In this figure, as in the following figures, the housing is sectioned by a horizontal plane to ensure that the internal elements are visible.

The headlamp 1 is provided to ensure an AFS function (Adaptive Frontlighting System). This is a matter of optimising the lighting. In the case of FIG. 3, this optimisation of the lighting is obtained through a BL function (Bending Light or low-beam bending lamp), according to which a low-beam lamp 4 is mounted in such a way as to rotate in terms of the azimuth to illuminate where the vehicle is going and not just straight ahead.

The low-beam lamp 4 is mounted on a plate 5, which is itself mounted so as to be rotatable about an essentially vertical pivot 6, situated in the longitudinal centre plane of the headlamp or in the vicinity of this plane, for example. The low-beam headlamp 4 is arranged in the vicinity of an edge of the plate 5 remote from the pivot 6. Any full-beam headlamp 7 which may be present can be fitted in the vicinity of the other edge of the plate 5. However, the full-beam headlamp does not have to be attached to the plate of the low-beam lamp 4 and may not even exist if the low-beam lamp 4 has a dual function. The arrows L symbolize the light beams emitted by the low-beam lamp 4 and the full-beam headlamp 7.

The assembly shown in FIG. 3 and in the subsequent figures is simplified so as to illustrate the invention. In reality, the headlamps include more complex axes of rotation and anchoring points than those shown in the schematic drawings, though nonetheless compatible with the solution according to the invention.

The rotary motion of the plate 5 about the pivot 6 is ensured by an electric motor 8, the casing of which is mounted in a manner fixed relative to the housing 2 on the opposite side of the plate 5 from the optic 3. The motor 8 controls the displacements of a rod 9 parallel to the longitudinal axis of the vehicle (by means of a mechanical system, which is not shown), as indicated by a double arrow H. The opposite end of the rod 9 from the motor 8 is linked by a joint to the rear face of the plate 5, at a distance from the pivot 6.

The amplitude and direction of the rotation of the motor 8 are controlled by a computer 10 forming a calculation and control unit linked by a cable 11 to the motor 8. The unit 10 is supplied with electric power by a cable 12 and receives information on the vehicle from various sensors (not shown) via a cable 13. The cable 13 can provide a direct or multiplexed cabled link. The unit 10 can exchange information with the sensors, as indicated by the double arrow along the cable 13.

The housing of the control unit 10 can be situated either inside or outside the headlamp 1 at any location in the vehicle, and the vehicle can have one or two of them (one for both sides or one for each side).

The ACC driving assistance device includes an emitter 14 mounted on the plate 5, in the central region of this plate, for example. The emitter 14, which is of the radar or lidar type, emits a beam towards the front, indicated schematically by the arrow 15. The ACC device includes a receiver 16, likewise mounted on the plate 5. The receiver 16 receives part of the beam reflected by the target vehicle, as indicated schematically by the arrow 17.

The ACC device is linked to the control unit 10 by a multiwire harness 18 allowing the supply and exchange of information.

The headlamp 1 in FIG. 3 is of the MBL type (Main Bending Light/swivelling low-beam lamp), in which the low-beam lamp 4 turns about the vertical pivot 6, following the direction of curvature of the road, in order to illuminate well the inward-curved edge of the road.

The information transmitted via the cable 13 to the unit 10 to drive the BL function can be, without being restrictive:

the angle at the steering wheel of the vehicle;

information from gyroscopic or yaw sensors fitted to the vehicle;

the speed of the vehicle, which allows detection of an exit from a bend, the driver generally accelerating before the steering wheel has returned to a straight line;

detection of the shape of the road by measuring the shape of the dividing line or lines;

navigation information, where available; in this case, the unit 10 can have advance information on the section of road in front of the vehicle when the latter is fitted with a navigation system, e.g. a satellite navigation system or GPS.

The last three sources of information allow anticipation of the path of vehicle and hence of the performance of the driving assistance device, the first two sources merely describing the configuration underneath the vehicle.

The device in FIG. 3 operates as follows:

When the driver activates the ACC assistance device, the control unit 10 is supplied with power and put into operation, even if the vehicle is travelling in broad daylight, when the low-beam lamp 4 is off. The motor 8 is controlled by the unit 10, and the plate 5 turns about the vertical pivot 6 in accordance with information received on the profile of the road. The beam F of the emitter 14, that is to say the arrow 15 that represents it schematically, will be best aligned as a function of the curvature of the road, which improves the tracking of the target vehicle B.

As the ACC device is fitted on the plate 5 already provided for the BL function for optimising the lighting, improving the operation of the ACC device does not require an additional expensive angular motor drive or additional interpretation of data on the vehicle.

Moreover, the integration of the ACC device into the headlamp 1 allows it to benefit from the features (headlamp wash, leaktightness) that protect it from rain and dirt, this being particularly important in the case of an ACC device with lidar, the emission and reception of which in the infrared range are particularly affected by a reduction in the transparency of the optic 3.

Moreover, headlamps are increasingly being fitted with attitude correction, corresponding to a rotation of the plate 5 about a transverse horizontal axis (not shown). The ACC device will then benefit from this attitude correction, allowing simplification of the vertical scanning of the targets.

Figure 4:
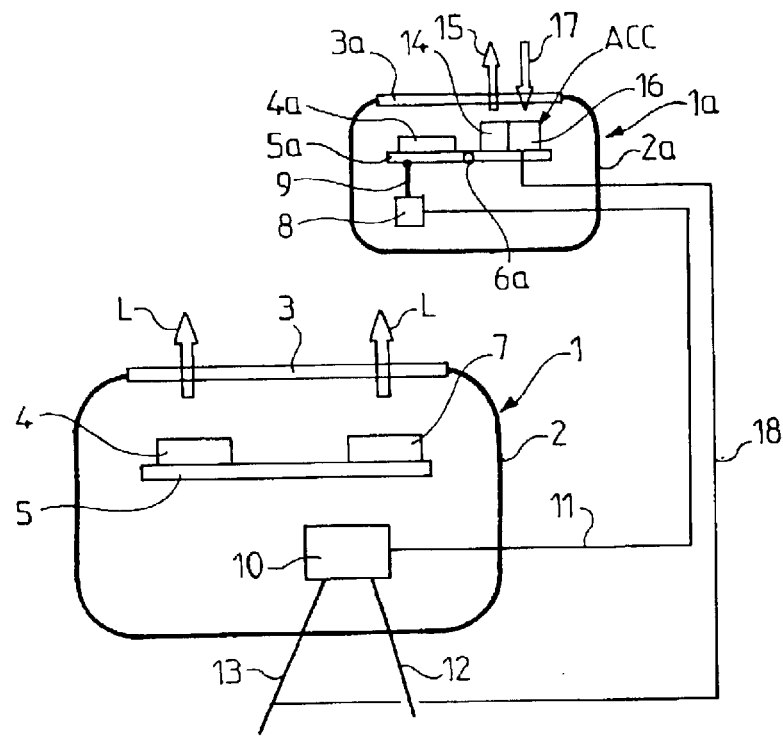
FIG. 4 is a schematic plan view of a main headlamp and an additional headlamp incorporating an ACC device.

FIG. 4 shows a variant embodiment, in which the ACC device is integrated into a headlamp 1a of the ABL type, that is to say an additional swivelling headlamp.

The elements that are identical to the elements already described with reference to FIG. 3 are designated by the same reference numbers without being described again. It will be noted that, in the main headlamp 1, the plate 5 (which carries the low-beam lamp 4 and any full-beam headlamp 7) is fixed in terms of the azimuth, that is to say it no longer turns in a horizontal plane relative to the housing 2. There can be attitude or elevation correction.

Optimisation of the lighting is ensured with the aid of the additional headlamp 1a fitted in the protective moulding or bumper of the vehicle. The housing 2a of the headlamp 1a includes a plate 5a mounted so as to be rotatable about a vertical pivot 6a. Fitted to the front of the plate is a headlamp 4a, the azimuth of which is modified by rotation of the plate 5a. This rotation is controlled by the motor 8, the casing of which is mounted in a fixed manner in the housing 2a. The motor 8 is linked by the cable 11 to the control unit 10, which is situated in the housing 2 of the headlamp 1. The ACC assistance device is fixed on the plate 5a at the front, on the opposite side of the pivot 6a from the headlamp 4a. The cable 18 links the unit comprising the emitter 14 and the receiver 16 of the ACC device to the control unit 10. When the ACC device is put into operation, the unit 10 controls the rotation of the plate 5a about the vertical pivot 6a as a function of the information on the curvature of the road. The ACC device is suitably oriented to ensure better tracking of the target vehicle B. In daylight, the headlamp 4a remains off, and the rotation of the plate 5a is used only by the ACC device. At night, when the headlamp 4a is on, the rotation of the plate 5a simultaneously ensures optimisation of lighting and optimisation of the tracking of the target vehicle.

Of course, the arrangement of the control unit 10 in the housing 2 of the headlamp 1 is not restrictive. This control unit 10 can be situated either in the protective moulding or in the engine compartment or at any other advantageous point on the vehicle. The additional headlamp 1a can also include fog lamps.

If there is only one ACC device, provided on only one side of the vehicle, the style or external appearance of the vehicle can be standardized by fitting a dummy element of the same appearance as the ACC device in the additional headlamp situated on the other side of the vehicle.

Figure 5:
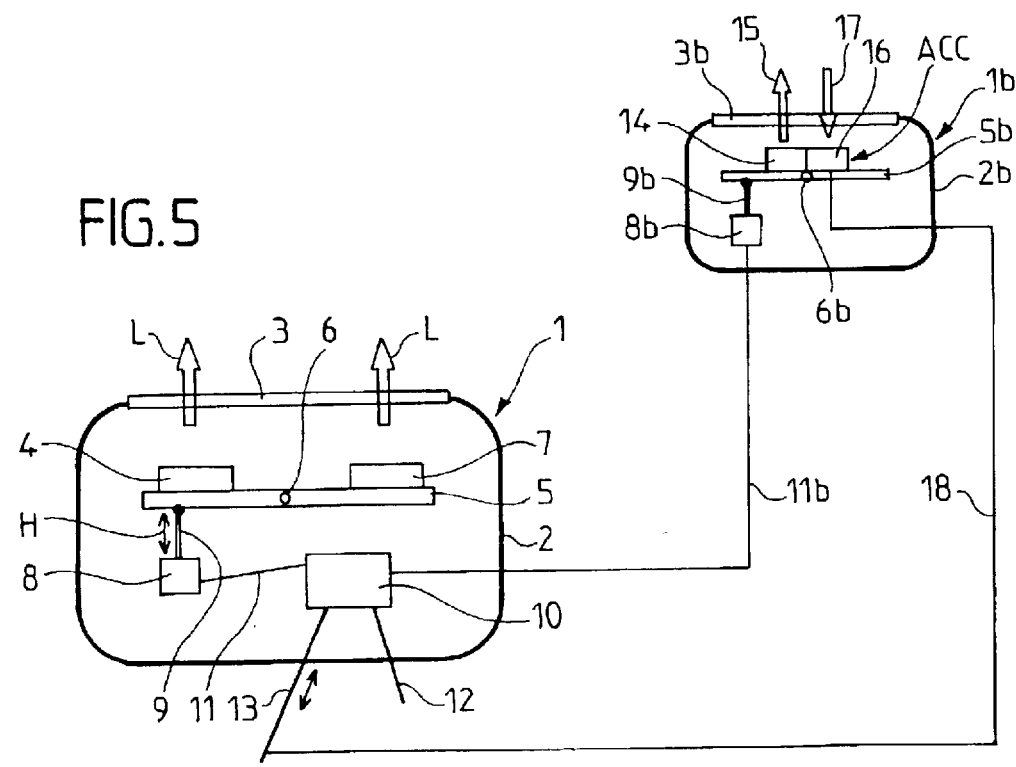
FIG. 5 shows an ACC device arranged in a housing separate from the main headlamp.

FIG. 5 shows a variant embodiment, according to which the ACC device is detached mechanically from the MBL-type headlamp 1 in FIG. 3, the identical elements of which are designated by the same reference numbers.

The emitter 14 and the receiver 16 of the ACC device are fixed at the front of a plate 5b mounted so as to be rotatable about a vertical pivot 6b in a housing 2b specific to the ACC device. The housing 2b is arranged in the centre at the front of the vehicle, in front of the radiator, for example. A motor 8b, the casing of which is fixed relative to the housing 2b, is placed behind the plate 5b, on one side of the latter. The motor 8b controls the rectilinear displacement of a rod 9b substantially perpendicular to the plate 5b. One end of the rod 9b is articulated on the plate. The displacement of the rod 9b causes the rotation of the plate 5b about the pivot 6b. The front face of the housing 2b is formed by a wall 3b transparent to the radiation of the emitter 14. Control of the motor 8b is performed by the unit 10, which is linked to this motor by a cable 11b.

The azimuth of the plate 5b of the emitter 14 can thus be modified either according to the same angle data as for the plate 5 of the headlamp 1 or in proportion to the said data.

Figure 6:
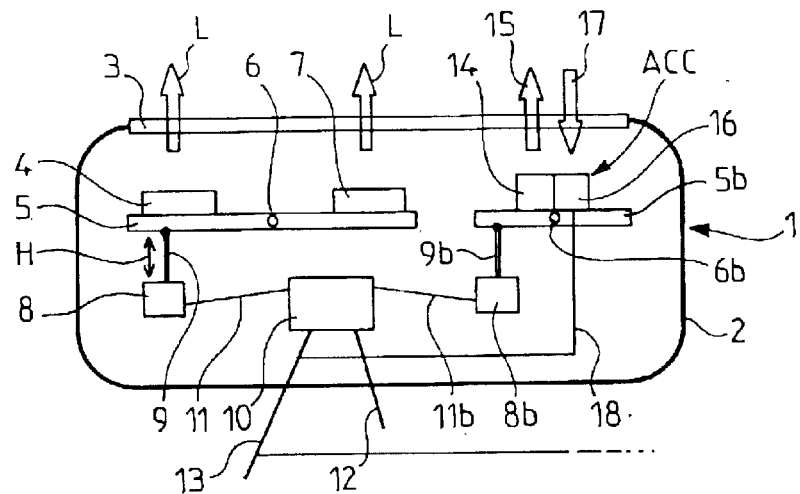
FIG. 6 shows a variant of FIG. 3.

FIG. 6 shows a variant embodiment which differs from that in FIG. 5 only in the fact that the ACC device is fitted in the same, enlarged, housing 1 as the main swivelling headlamp. However, the ACC device is still fitted on a different rotary plate 5b than the plate 5 of the swivelling headlamp. The same reference numbers are used to designate elements identical to those in FIG. 5.

Figure 7:
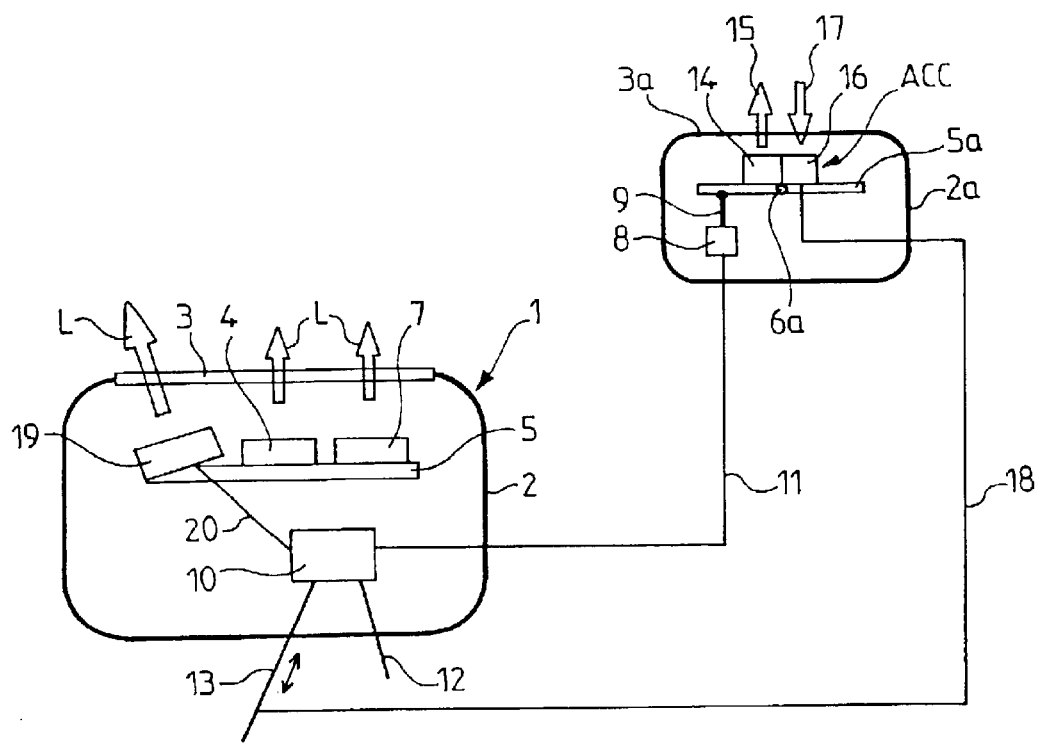
FIG. 7 shows a variant of FIG. 5.

FIG. 7 shows a variant embodiment, according to which each headlamp 1 of the vehicle is fitted with a fixed bend-illumination headlamp 19 (designated by the abbreviation FBL), pre-turned toward the outside. According to the diagram in FIG. 7, the headlamp 1 is the one situated on the left of the vehicle, the headlamp 19 being pre-turned to the left. The supply of electric power to the headlamp 19 is ensured by a cable 20 linked to the control unit 10. The rotation or luminous intensity of the headlamp 19 is adjusted as a function of the parameters of the road and the vehicle, which are collected by the unit 10. The azimuth of the plate 5 is not modified as a function of these parameters.

As in FIG. 4, the ACC device with its emitter 14 and its receiver 17 is mounted in a separate housing 2a on a rotary plate 5a, the orientation of which about the vertical pivot 6a is controlled by the unit 10 as a function of the parameters of the road and of the vehicle.

Figure 8:
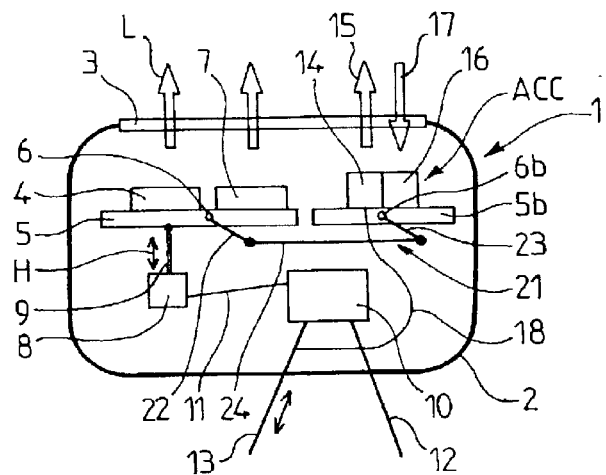
FIG. 8 shows a variant of FIG. 6.

FIG. 8 shows a variant embodiment of the device in FIG. 6, similar elements being designated by the same reference numerals.

Two different plates 5, 5b are provided to support respectively the headlamps 4, 7 and the unit comprising the emitter 14 and the receiver 16 of the ACC device. The plates 5, 5b are mounted so as to be rotatable about respective vertical pivots 6, 6b.

The plate 5b is driven in rotation about the pivot 6b by a mechanism 21 for transmitting the rotary motion of the plate 5. The mechanism 21 illustrated schematically in FIG. 8 is of the deformable-parallelogram type comprising two parallel rockers 22, 23 locked in rotation on the plates 5, 5b, respectively, and a connecting rod 24 articulated at each of the ends of the rockers 22, 23 remote from the pivots 6, 6b. Any other transmission mechanism that allows rotation of the plate 5b identical or proportional to that of the plate 5 is suitable.

The ACC device will follow the contour of the road in the same way as the headlamps 4, 7 fitted on the movable plate 5 providing the BL function.

Figure 9:
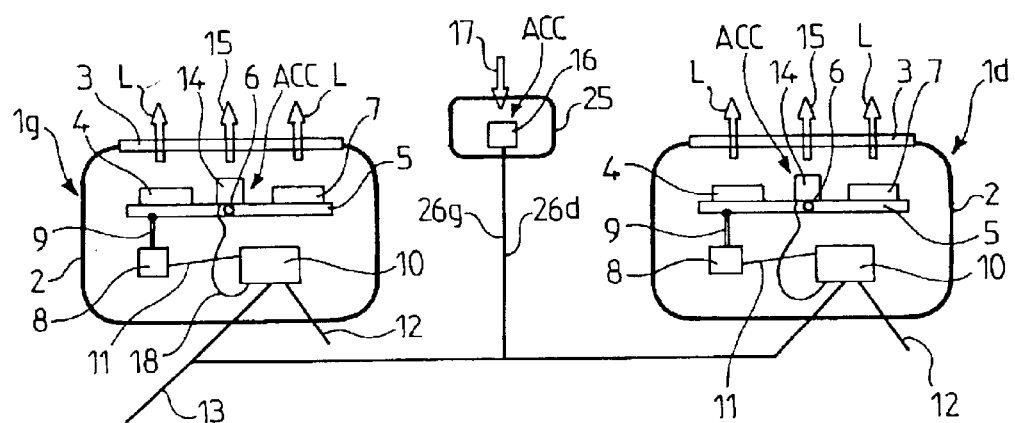
FIG. 9 shows schematically a view from above of another variant embodiment.

FIG. 9 shows a variant embodiment, according to which the receiver 16 of the ACC assistance device is fixed relative to the chassis of the vehicle and arranged, for example, in a housing 25 situated at the front, in the centre of the vehicle. The emitter 14 is mounted so as to be rotatable about a vertical pivot in such a way as to follow the curvature of the road. According to the variant in FIG. 9, the emitter 14 is mounted on the plate 5 of an MBL-type headlamp, such as that shown in FIG. 3. The plate 5 carries the low-beam lamp 4 and any full-beam headlamp 7. The motor 8 controlling the rotation of the plate 5 features once again.

If the lighting optimisation system controls rotation in the horizontal plane of the headlamps, both toward the inside of the bend and toward the outside, only a single emitter 14 is required for the ACC assistance device. It can be mounted either on the plate 5 of the right-hand headlamp 1d or of the lefthand headlamp 1g. This consideration applies to all the scenarios mentioned.

If the lighting optimisation system is provided to turn only the headlamp situated on the inside of the bend, an emitter 14 is provided on the plate 5 of the right-hand headlamp 1d and of the left-hand headlamp 1g for the ACC assistance device.

The receiver 16 is linked to the control unit 10 of the left-hand headlamp and of the right-hand headlamp by two cables 26d, 26g respectively.

Operation is the same as that explained above, the emitter 14 being aligned according to the curvature of the road.

Another possible scenario is that in which each of the headlamps can turn toward the outside to provide a BL function and is fitted with an ACC assistance device. FIGS. 3 to 8 then represent both the right-hand side and the left-hand side. The unit is set up so that the active side (side of the headlamp which is in the process of turning) inhibits the ACC device on the other side, since only one ACC device is used at any one time. The information wires must then be connected as shown in FIG. 9.

Whatever the version, the invention makes it possible to deflect the beam emitted, whether a radar or lidar beam, as a function of the information on the curvature of the road, and to improve tracking of the target vehicle B by inserting a rotary mechanism into the ACC assistance device.

The rotary mounting of the ACC device can be provided even if the vehicle is not fitted with a lighting optimisation system that takes into account the curvature of the road.

What is claimed is:

1. A driving assistance device for a motor vehicle, including at least one emitter of radiation for radar or lidar toward the front of the vehicle, at least one receiver of part of this radiation reflected by a target vehicle, and control and calculation means for influencing the acceleration and braking of the following vehicle in accordance with the information coming from the unit comprising the emitter and the receiver and in accordance with data pertaining to the following vehicle, characterized in that at least the emitter is mounted so as to be rotatable in terms of the azimuth and in that means for driving the emitter in rotation are provided in order to modify the azimuth of the beam of the emitter in accordance with the curvature of the road.

2. The device according to claim 1, wherein the receiver is mounted so as to be rotatable with the emitter.

3. The device according to claim 1 for a vehicle fitted with a lighting optimization system including means capable of providing information on the curvature of the road, characterized in that control of the rotation of the emitter of the driving assistance device is performed on the basis of road curvature information gathered by the control unit of the lighting optimization system.

4. The device according to claim 1, which is integrated into a headlamp.

5. A driving assistance device for a motor vehicle, including at least one emitter of radiation toward the front of the vehicle, at least one receiver of part of this radiation reflected by a target vehicle, and control and calculation means for influencing the acceleration and braking of the following vehicle in accordance with the information coming from the unit comprising the emitter and the receiver and in accordance with data pertaining to the following vehicle, characterized in that at least the emitter is mounted so as to be rotatable in terms of the azimuth and in that means for driving the emitter in rotation are provided in order to modify the azimuth of the beam of the emitter in accordance with the curvature of the road, wherein the device is integrated into a headlamp and includes a rotary headlamp mounted on a plate that can rotate in terms of the azimuth about an essentially vertical pivot to ensure optimization lighting, and an emitter mounted on the same rotary plate as the headlamp.

6. The device according to claim 5, wherein the rotary headlamp is an additional headlamp, in particular fitted in the protective moulding of the vehicle, and in that at least the emitter of the assistance device is mounted on the rotary plate of the additional headlamp.

7. A driving assistance device for a motor vehicle, including at least one emitter of radiation toward the front of the vehicle, at least one receiver of part of this radiation reflected by a target vehicle, and control and calculation means for influencing the acceleration and braking of the following vehicle in accordance with the information coming from the unit comprising the emitter and the receiver and in accordance with data pertaining to the following vehicle, characterized in that at least the emitter is mounted so as to be rotatable in terms of the azimuth and in that means for driving the emitter in rotation are provided in order to modify the azimuth of the beam of the emitter in accordance with the curvature of the road, wherein the device is integrated into a headlamp mounted on a plate rotatable in terms of the azimuth about an essentially vertical pivot to ensure optimization of lighting, wherein the emitter is mounted on a different, auxiliary plate rotatable in terms of the azimuth about a vertical pivot, rotational control of this plate being provided by the control unit of the plate of the headlamp.

8. The device according to claim 7, wherein the auxiliary plate is arranged in the same housing as the plate of the headlamp.

9. The device according to claim 8, which comprises a mechanism for transmitting the rotation of the plate of the headlamp to the auxiliary plate.

10. The device according to claim 7, wherein the auxiliary plate is arranged in a different housing than that accommodating the plate of the headlamp.

11. The device according to claim 7, wherein a device for driving the auxiliary plate in rotation is controlled by the control unit of the plate of the headlamp.

12. A driving assistance device for a motor vehicle, including at least one emitter of radiation toward the front of the vehicle, at least one receiver of part of this radiation reflected by a target vehicle, and control and calculation means for influencing the acceleration and braking of the following vehicle in accordance with the information coming from the unit comprising the emitter and the receiver, and in accordance with data pertaining to the following vehicle, characterized in that at least the emitter is mounted so as to be rotatable in terms of the azimuth and in that means for driving the emitter in rotation are provided in order to modify the azimuth of the beam of the emitter in accordance with the curvature of the road, wherein the device is integrated into headlamp that includes an additional fixed, pre-turned headlamp, the luminous intensity of which is controlled by a unit in accordance with the curvature of the road, wherein the emitter is mounted on an auxiliary plate rotatable in terms of the azimuth about a vertical pivot, the device for driving this plate in rotation being controlled by the control unit for the luminous intensity of the additional headlamp.

13. The device according to claim 5, wherein the receiver is mounted on the same rotary plate as the emitter.

14. The device according to claim 5, wherein the receiver is mounted in a fixed manner in a housing situated at the front of the vehicle, preferably in the central region.

15. The device according to claim 14, wherein an emitter is mounted in both the right-hand and the left-hand headlamp, on the corresponding rotary plate.

16. The device according to claim 5 for a vehicle fitted with a lighting optimization system controlling rotation in the horizontal plane of the headlamps, both toward the inside and toward the outside of a bend, characterized in that a single emitter is provided for the assistance device, this emitter being mounted either on the plate of the right-hand headlamp or of the left-hand headlamp.

17. The device according to claim 5 for a vehicle fitted with a lighting optimization system in which each of the headlamps can turn toward the outside to provide a BL function, characterized in that each of the headlamps is fitted with an assistance device and in that the unit is set up so that the active side (side of the headlamp which is in the process of turning) inhibits the assistance device on the other side to ensure that only one assistance device is used at any one time.

* * * * *